US008997446B2

(12) United States Patent
Dietrich et al.

(10) Patent No.: US 8,997,446 B2
(45) **Date of Patent: *Apr. 7, 2015**

(54) PNEUMATIC FRUIT DECELERATOR BODY

(75) Inventors: Charles Dietrich, Kalkaska, MI (US); Michael Rasch, Conklin, MI (US); Philip A. Brown, Conklin, MI (US)

(73) Assignee: DBR Conveyor Concepts, LLC, Conklin, MI (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/409,997

(22) Filed: Mar. 1, 2012

(65) Prior Publication Data

US 2013/0091821 A1 Apr. 18, 2013

Related U.S. Application Data

(60) Provisional application No. 61/627,655, filed on Oct. 17, 2011.

(51) Int. Cl.
*A01D 46/00* (2006.01)
*B65G 51/02* (2006.01)

(52) U.S. Cl.
CPC .............. *A01D 46/005* (2013.01); *B65G 51/02* (2013.01)

(58) Field of Classification Search
USPC ................................ 56/329, 328.1, 332, 336
See application file for complete search history.

(56) References Cited

U.S. PATENT DOCUMENTS 2,545,072 A 3/1951 Denman
2,752,926 A 7/1956 James
2,968,907 A 1/1961 Bernheim et al.
3,420,046 A 1/1969 Johnson et al.
3,469,258 A 1/1969 Stokes
3,464,529 A 9/1969 Horsky, Jr.
3,473,312 A 10/1969 Holt
3,556,355 A 1/1971 Ruiz
3,564,826 A 2/1971 Middleton, Jr.
3,591,949 A 7/1971 Connery
3,613,868 A 10/1971 Rickerd et al.
3,641,738 A 2/1972 Johnson
3,664,104 A 5/1972 Jamshidi
3,756,001 A 9/1973 Macidull
3,898,785 A 8/1975 Chew
3,913,307 A 10/1975 Cardinal, Jr.
3,969,878 A 7/1976 Morganeier
4,000,602 A 1/1977 Cardinal, Jr.
4,482,960 A 11/1984 Pryor
(Continued)

FOREIGN PATENT DOCUMENTS

SU 934975 6/1982

*Primary Examiner* — Thomas B Will
*Assistant Examiner* — Mai Nguyen
(74) *Attorney, Agent, or Firm* — Waters & Oppenhuizen PLC; David L. Oppenhuizen

(57) ABSTRACT

A decelerator apparatus for mounting at the end of a pneumatic or gravity-fed fruit harvesting or delivery tube. The decelerator comprises a housing with a moving decelerator body aligned with a fruit-receiving inlet connected to the delivery tube. The decelerator body, for example a padded rotating wheel, moves at a speed slower than the speed at which the fruit is delivered into the housing, includes multiple depressions or indentations for receiving and separating fruit, and further defines a compressive deceleration path that moves the fruit in a compressive but protective fit toward a housing exit, releasing the fruit after the fruit has been decelerated to the speed of the moving body.

6 Claims, 18 Drawing Sheets

(56) References Cited

U.S. PATENT DOCUMENTS

| | | | | |
|---|---|---|---|---|
| 4,501,113 | A | 2/1985 | Gerber | |
| 4,519,193 | A | 5/1985 | Yoshida et al. | |
| 4,532,757 | A | 8/1985 | Tutle | |
| 4,558,561 | A | 12/1985 | Mendenhall | |
| 4,621,573 | A | 11/1986 | Lange | |
| 4,663,925 | A | 5/1987 | Terada | |
| 4,674,265 | A | 6/1987 | Gerber | |
| 4,718,223 | A | 1/1988 | Suzuki et al. | |
| 4,769,700 | A | 9/1988 | Pryor | |
| 4,793,461 | A * | 12/1988 | Leonard | 198/341.02 |
| 4,836,355 | A * | 6/1989 | Blanc | 198/418.6 |
| 4,958,556 | A * | 9/1990 | Aquino et al. | 99/355 |
| 4,975,016 | A | 12/1990 | Pellenc et al. | |
| 4,999,986 | A | 3/1991 | Peterson | |
| 5,005,347 | A | 4/1991 | Kedem et al. | |
| 5,167,317 | A * | 12/1992 | van der Schoot et al. | 198/469.1 |
| 5,301,792 | A * | 4/1994 | Spatafora et al. | 198/408 |
| 5,673,649 | A * | 10/1997 | Duecker et al. | 119/337 |
| 6,109,421 | A * | 8/2000 | Ross et al. | 198/457.07 |
| 6,588,501 | B1 * | 7/2003 | Boyadjieff | 166/75.15 |
| 7,112,120 | B2 * | 9/2006 | Rivir et al. | 451/38 |
| 7,428,961 | B2 * | 9/2008 | Temming et al. | 198/723 |
| 7,540,137 | B2 | 6/2009 | Gray | |
| 7,695,220 | B2 | 4/2010 | Bryan et al. | |
| 7,854,106 | B2 | 12/2010 | Martin et al. | |
| 7,926,252 | B2 | 4/2011 | Dietrich et al. | |
| 7,971,814 | B2 * | 7/2011 | Evans et al. | 241/60 |
| 2011/0047955 | A1 * | 3/2011 | Dietrich et al. | 56/328.1 |

* cited by examiner

PNEUMATIC FRUIT DECELERATOR BODY

RELATED APPLICATIONS

This application claims the benefit of U.S. Provisional Application Ser. No. 61/627,655, filed Oct. 17, 2011, by the same inventors, entitle Pneumatic Fruit Decelerator Body, and which is incorporated herein in its entirety.

DESCRIPTION

Field

The subject matter of the present application is in the field of fruit and vegetable harvesting apparatus, and particularly devices for handling and loading fruit into containers in the field upon harvesting.

BACKGROUND

In the field of fruit harvesting, labor costs and worker availability issues remain a large concern. Our attempts at harvest assist by vacuum tubes and decelerators have been successful and ongoing. A fruit picker removes the fruit from the tree and places the fruit into a vacuum tube where by vacuum pressure moves the fruit through the tube to the decelerator. The decelerator cushions and slows the fruit to the speed of the decelerator body and subsequently exits the fruit from the vacuum environment while maintaining a vacuum seal.

BRIEF SUMMARY

We have invented an alteration to a patented pneumatic fruit decelerator apparatus and method, U.S. Pat. No. 7,926, 252, incorporated herein by reference, by the same inventors. It can be beneficial to add ripples or cavities to the endless deceleration body to help urge fruit through while maintaining a pneumatic seal. For illustration purposes, a wheel is used whereby compressive frictional deceleration occurs and fruit singularity lessens fruit bruising from fruit to fruit contact.

In a further embodiment, a passive-feed decelerator and filler, and method for its use, is provided. The decelerator can utilize the deceleration body having cavities or ripples according to the above-described invention. The decelerator and filler is mounted in a carriage being towed by a tractor. In one embodiment, the decelerator and filler is fixedly mounted within the tubular framework of the carriage relative to a given datum. A fork lift mechanism is mounted to the carriage for vertical movement of a fruit bin carried within the carriage. The fruit bin is supported within the carriage by the forks of the fork lift mechanism. The lower portion of the carriage is open to the rear to allow movement of the fruit bin into and out of the carriage. The fruit bin is raised so that the decelerator and filler is inserted into the fruit bin to minimize the drop height of fruit distributed from the decelerator and filler into the fruit bin. As the level of fruit rises within the bin, the fork lift mechanism lowers the fruit bin to maintain a constant level of fruit relative to the filler. An optical sensor or electric eye can be used to provide input to a controller that automatically raises or lowers the fork lift mechanism. In the alternative, the fruit bin can be carried in a stationary position and the decelerator and filler can be mounted movably within the carriage and raised or lowered as necessary. As a fruit bin is filled, it can be removed from the carriage and an empty fruit bin put in its place. Additional fruit bins can be carried by a trailer towed behind the tractor and carriage.

These and other features and advantages of the invention as defined in the claimed subject matter will become apparent from the detailed description below, in light of the accompanying drawings.

DETAILED DESCRIPTION

Figure 1:
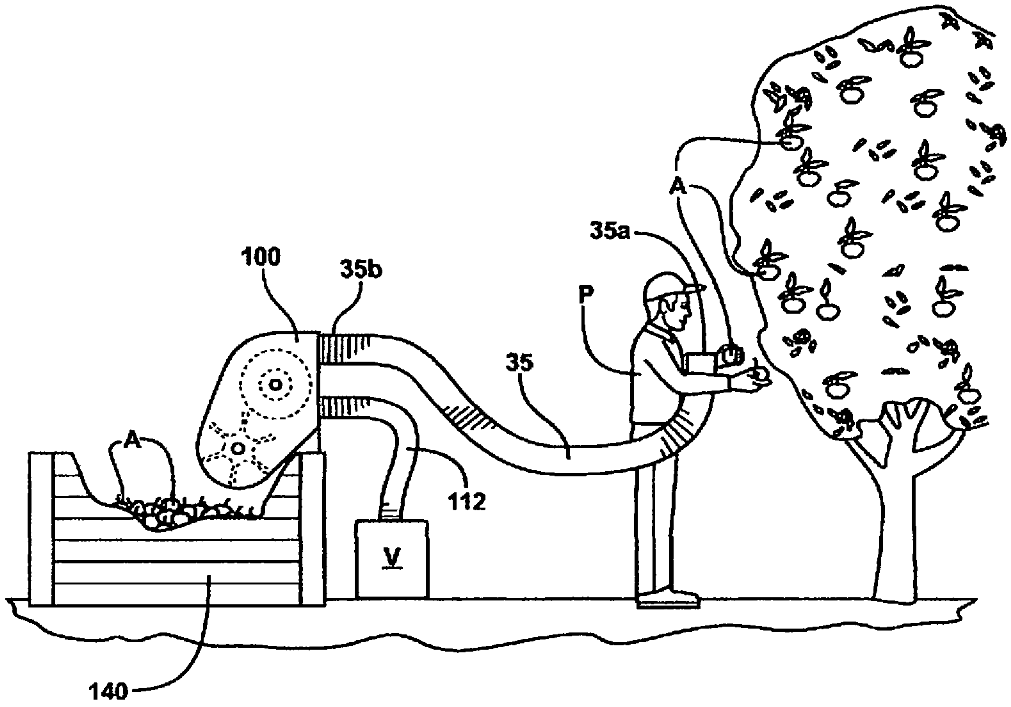
FIG. 1 is a schematic illustration of a fruit-picking pneumatic tube, complemented with a decelerator according to the claimed subject matter, the decelerator connected at a fruit-delivering end of the tube, the decelerator located in a fruit-collecting container.

FIG. 1 schematically shows an apple picker P who is picking apples A from a tree F, and depositing the apples in a first end 35*a* of a pneumatic tube 35 leading to a bin 140 or a water bath or some other fruit collection device or container. The construction of pneumatic tube 35 of FIG. 1 may vary, and may be of a construction generally known in the prior art or of some newer construction, but generally represents a pneumatic delivery tube that delivers apples A from a second end 35*b* at a speed which can cause bruising or damage to the fruit. Tube 35 is accordingly complemented by a decelerator 100 according to the present invention, as defined by the claimed subject matter.

It will be understood that although the illustrated example in FIG. 1 shows a single picker P working on the ground with a single tube 35, the number of pickers and tubes and the manner in which they are positioned and/or moved relative to the fruit being picked may vary. For example, the pickers may be positioned and/or moved using motorized platforms, lift platforms or ladders, and the decelerator 100 may be supplied with fruit by multiple tubes 35 handled by one or more pickers.

Figure 2:
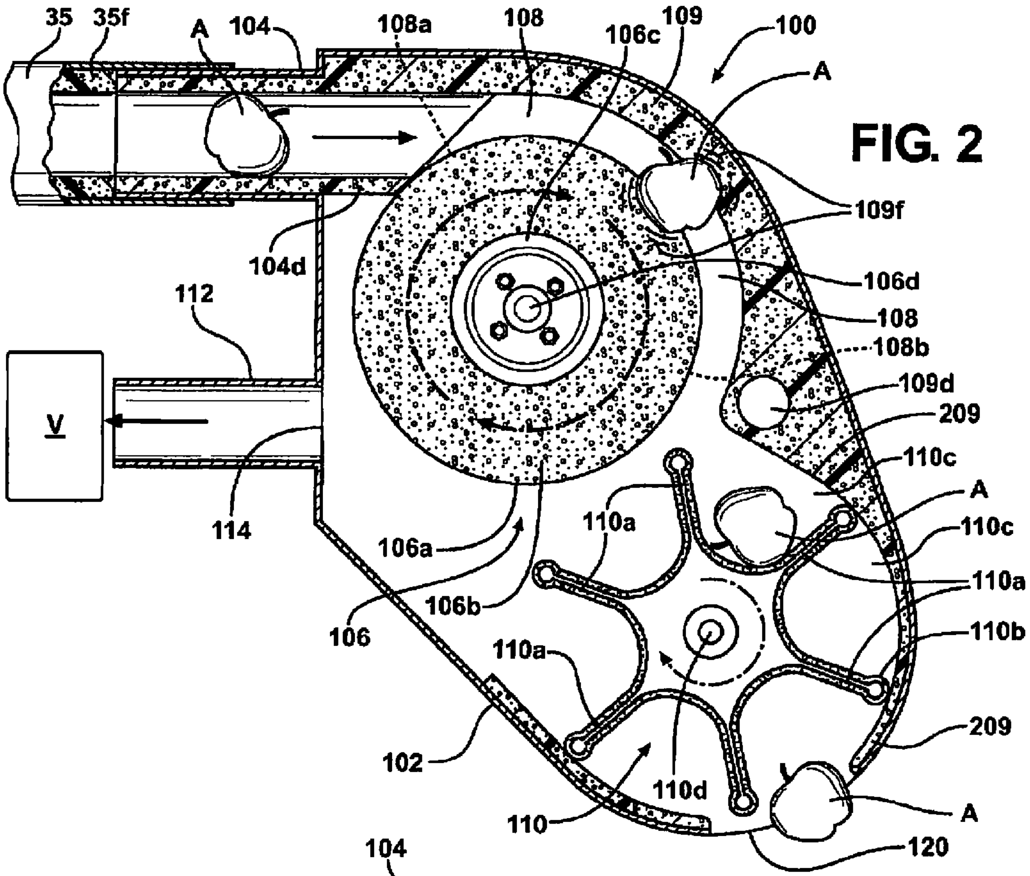
FIG. 2 is a side elevation view of a first example of a fruit decelerator according to the claimed subject matter, with a moving decelerator body enclosed in a pneumatically sealed housing.
Figure 3:
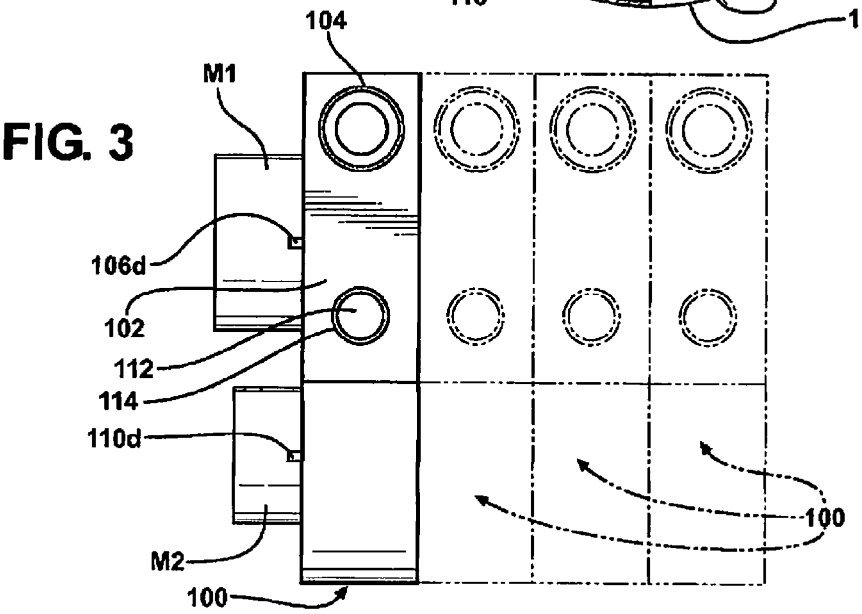
FIG. 3 is an end view of the decelerator of FIG. 2, with optional multiple decelerators shown in a parallel, commonly-driven assembly in phantom lines.

FIGS. 2 and 3 show cutaway views of a first example of decelerator 100 according to the claimed subject matter. Decelerator 100 has a housing 102 adapted to be connected to a pneumatic delivery tube such as 35. "Housing" is intended to include any chamber or path with sufficient structure and sealing to receive the fruit from the pneumatic tube and to maintain pneumatic supply pressure in the delivery tube while defining a decelerator path in combination with a moving decelerator body. Decelerator housing 102 may be provided with a collar or other suitably shaped inlet 104 to be mated with tube 35, with a more or less pneumatically sealed connection. The details of the connection between tube 35 and housing 102 may vary, provided the fruit is delivered pneumatically into the housing. While the section of tube 35 connected to the housing 102 to deliver fruit to the decelerator may be referred to as an "end" of the tube, it should be understood that the decelerator 100 could be mounted in an intermediate location in a tube delivery path and is not limited to being connected to a terminal end of single tube.

While the details of pneumatic delivery tube 35 may vary, in the illustrated example the tube 35 is an open-passage, internally-padded tube which we have invented, with a relatively smooth layer of foam or similar padding 35*f* lining the interior surface. Foam lining 35*f* is illustrated as closed-cell foam that is generally smooth and impermeable to air, or lining 35*f* may be an open-cell foam with an air-impermeable surface seal. Alternately, tube 35 may be another type of pneumatic delivery tube, whether of a prior known type or some other type, with a diameter sized to receive and conduct firm, relatively round fruit such as apples A from the picking or harvesting end 35*a* to the interior of housing 102.

Inlet 104, or alternately tube 35, is located (or extends to a location, as shown at extension 104*d* for example) adjacent a moving decelerator body 106 with at least an endless moving surface in communication with the interior of the housing, for example a rotating padded wheel as shown in FIG. 2. It will be understood that while a circular wheel rotating on a hub/shaft is illustrated in this example as the decelerator body 106, other types of moving decelerator body may be used, for example caterpillar- or conveyor-type endless belts or tracks rotating in the housing on one or more shafts or rollers. Decelerator 106 has a padded surface 106*a*, in the illustrated example of FIG. 2 formed by one or more layers of foam padding 106*b* mounted in a several-inch thickness around the hub 106*c* of the wheel. The surface of decelerator body 106 is designed to frictionally impart the decelerator's motion to incoming fruit A while also compressing or yielding under pressure from the fruit without damaging or bruising the fruit.

Decelerator body 106 moves the fruit A along a decelerator path 108 defined between the decelerator wheel 106 and another padded surface such as a similarly compressible layer of foam 109 mounted to an interior surface of housing 102 adjacent the decelerator 106. Foam 106*b* and 109 may be open-cell foam as illustrated, or combinations of open- and closed-cell foam, although other materials and methods for padding the wheel's surface and the opposing surface 109 of the decelerator path 108 are possible.

Decelerator path 108 is sized to receive fruit A in a compressive frictional fit, such that the fruit compresses the path and is forced through the path by the movement of decelerator 106 without deforming or damaging or bruising the fruit. In the illustrated example of FIG. 2, the height or diameter (depending on its shape) of path 108 is less than the diameter of the smallest size fruit A expected to be delivered from tube 35, so that the yielding surfaces defined by the foam 109 on the housing and the foam 106*b* on the decelerator body are compressed as the fruit is frictionally decelerated along path 108. The degree of cushioning or yielding or padding provided by wheel surface 106 and complementary decelerator path surface 109 may be different, such that one surface is more yielding or cushioning and one less yielding or cushioning, for example by choosing foams of different density. The degree of cushioning or compression of the path by the fruit may also vary along the length of the deceleration path 108 for various purposes and advantages; for example we have found that a void 109*d* in the foam 109 helps cushion the fruit at the end of the deceleration path 108 where the foam is shaped to deliver the fruit to secondary device 110.

The speed of decelerator 106 is slower than the speed at which fruit is expected to be delivered from tube 35, and the direction of motion of decelerator 106 is in the direction of fruit delivery into the housing. In the illustrated example of FIG. 2, for example, fruit is delivered into the housing from left to right, in the direction of the arrow through inlet 104, and wheel 106 is rotating in a clockwise direction, so that at the tangential point or location 108*a* at which fruit A engages path 108 (which is partly defined by the wheel 106), wheel 106 is already moving in the same direction as fruit A at first contact. Decelerator 106 then proceeds to decelerate and continue moving fruit A along path 108 in a compressive but non-damaging fit as shown schematically at 109*f*, until fruit A has been decelerated to at least the speed of wheel 106. Once fruit A has been decelerated, it can exit or be released from the path 108 at end 108*b* for further processing in the housing, or to leave the housing. The fruit may actually be decelerated in many or most or even all instances to a speed slower than the rotational surface speed or RPM (rotations per minute) of wheel 106, to the extent that the fruit A is itself rolling as it progresses through the deceleration path 108; however, for ease of reference, the speed of the fruit will be referred to as being decelerated to the speed of the wheel or to at least the speed of the wheel.

The speed of decelerator 106 is chosen to be slower than the speed at which fruit is pneumatically delivered to housing 102, and also chosen to minimize or eliminate damage or bruising to fruit A when it is released from path 108 and exits the housing. This decelerator speed may accordingly vary depending on the pneumatic tubing used and/or pneumatic delivery force with which fruit A is delivered to the decelerator and/or the nature of the fruit being moved through the decelerator.

It will be understood that although a single decelerator body 106 is illustrated for reducing the delivery speed of fruit A to a desired slower speed in a single stage, multiple decelerator bodies 106 may be used to successively decelerate fruit A in multiple stages until a desired release or exit speed is achieved at the last decelerator body 106 in the series. And while a single decelerator 100 is illustrated, multiple decelerators 100 may be serially arranged to stepwise decelerate fruit through multiple decelerator housings.

Decelerator path 108 ends at a location communicating with an exit from the housing, for example an exit opening 120 located so that fruit A exits the housing by gravity. While fruit A may exit the housing 102 directly after leaving the deceleration path 108 provided by decelerator body 106, fruit A may also be handled by a secondary device 110 before exiting the housing. Decelerator path 108 may run the full length of the sealed housing to the exit, or terminate prior to the exit provided the remainder of the fruit's path of travel through the housing to the exit does not damage the fruit.

In the illustrated example of FIG. 2, secondary device 110 is a paddle-type wheel with a plurality of radial paddles 110*a* projecting from a hub or shaft 110*d*, the paddles 110*a* padded with closed-cell foam 110*b*. As the paddles rotate (in the example, clockwise like decelerator wheel 106), they dynamically define one or more pneumatically sealed fruit-transporting compartments 110*c* upstream from exit 120 that are able to carry an item of fruit A with the pneumatic seal of the housing substantially intact until the fruit reaches exit 120. When fruit A reaches exit 120, the compartment assumes the exit pressure (e.g., ambient or atmosphere pressure). Upon passing the exit 120, the compartment defined between two adjacent paddles may return to a sealed condition and thus the internal pressure of the housing 102. The seal between housing 102 and exit 120 may be maintained, as shown in the illustrated example, by a wiping contact between the ends of paddles 110*a* and a portion of the housing interior such as foam lining 209 adjacent secondary wheel 110 and between deceleration path 108 and exit 120. Closed-cell foam or some other relatively air-impermeable cushioning material may be used for the covering 110*b* on paddles 110*a* and for the lining 209 in order to maintain the internal pressure of housing 102 relative to the pressure of exit 120.

While the pneumatic force that delivers fruit A into housing 102 may be created outside the housing 102, for example somewhere in tube 40 upstream of the decelerator 100, or downstream of (and connected to) exit 120, in the illustrated example the housing itself provides the pneumatic delivery force by generating a low or vacuum pressure in the housing relative to tube 40, for example by connecting a vacuum source illustrated schematically as vacuum pump V and vacuum supply tube 112 to the housing at a vacuum inlet 114 separate from fruit inlet 104. The vacuum pump or other vacuum or suction-generating device schematically illustrated at V may be attached to tube 112 at a convenient location, or may be incorporated onto or into the housing 102.

FIG. 3 illustrates a decelerator 100 from an inlet end view, and the option of "stacking" multiple decelerators 100, 100', etc. in parallel fashion to be driven by common motor and/or vacuum device. For example, a single motor M1 could drive a single shaft 106*d* to rotate two or more decelerator wheels 106 in adjacent decelerators. A single motor M2 could be connected through a single shaft 110*d* to drive two or more secondary wheels 110 in adjacent decelerators. A single source of vacuum V could be connected via one or more inlets 114 to pneumatically drive adjacent decelerators, whose housings 102 may or may not be sealed relative to one another.

While multiple decelerators 100 with their own housings are shown in parallel arrangement in FIG. 3, it would also be possible to provide a single decelerator housing 102 with multiple decelerator bodies 106 aligned with multiple fruit-delivering inlets 104.

Figure 4:
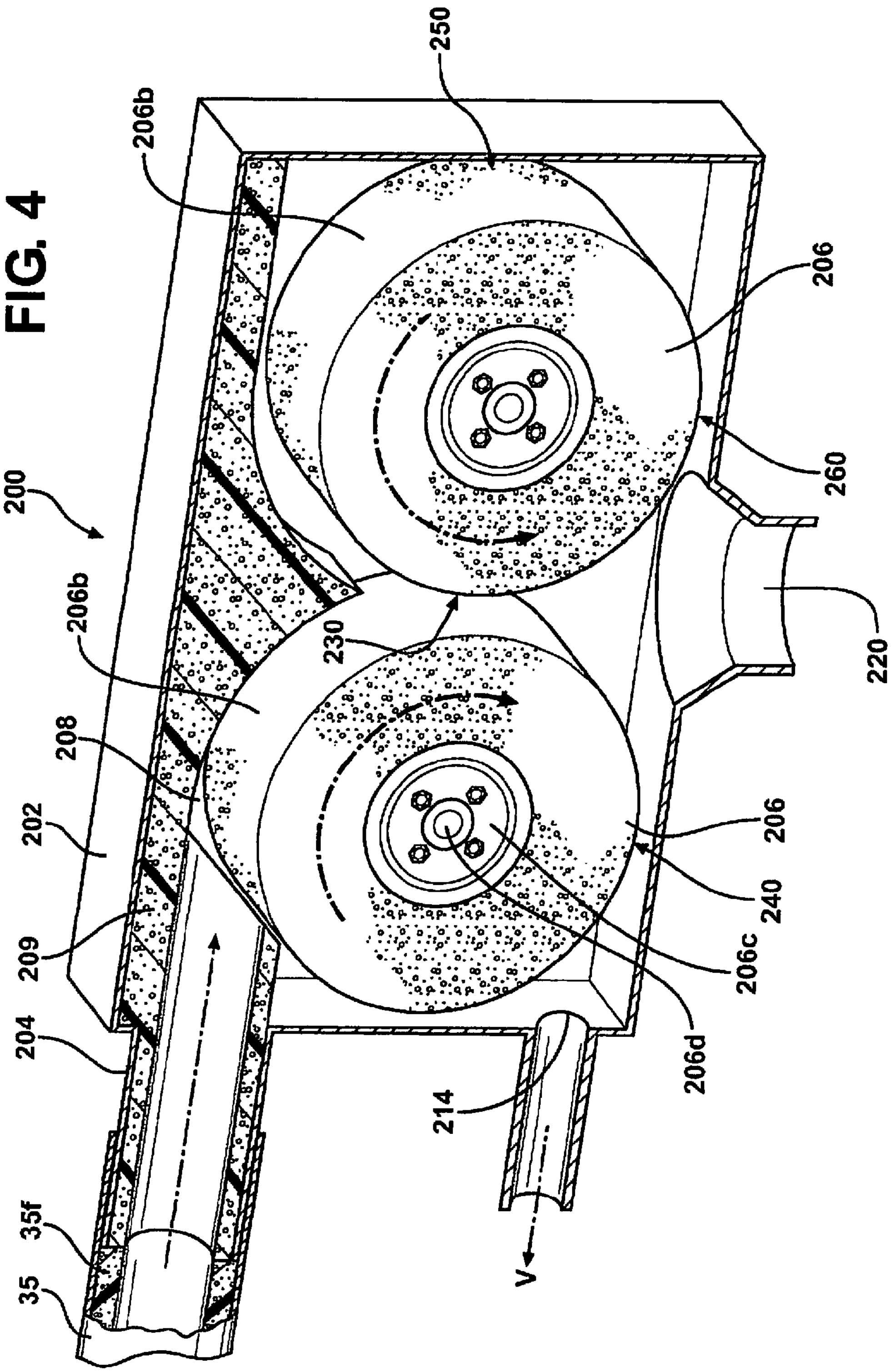
FIG. 4 is an alternate example of a fruit decelerator housing according to the claimed subject matter, in which the decelerator comprises two moving decelerator bodies.

FIG. 4 illustrates an alternate example of a decelerator at 200, with a housing 202, a pneumatic fruit delivery inlet 204, and opposing decelerator bodies or wheels 206 defining a deceleration path 208 defined between the wheel 206 closest to inlet 204 to a point of more or less pneumatically sealed contact 230 between the two wheels, leading to a single exit 220 below the junction of the two wheels. A single source of pneumatic delivery force is supplied at vacuum inlet 214. Decelerator wheels 206 have substantially the same construction and operation as wheel 106 in FIG. 2, except that they are cushioned (or at least surfaced) with a seal-maintaining material such as closed cell foam 206*b*, and they work in tandem. At least one wheel is powered by a motor means through its hub/shaft 206*c*, 206*d*, and the other wheel may be passively rotated by the powered wheel due to frictional, pneumatic-sealing contact between them at 230. Optionally both wheels 206 may be powered to rotate. Deceleration path 208 provides a compressive moving fit for fruit delivered from inlet 204 to the adjacent wheel 206, and is maintained at pneumatic delivery pressure or vacuum by the seal between the surfaced wheels at 230 and by additional seals, for example wiping seals between the surface of wheel 206 and the housing 202 at points 240, 250, and 260, isolating exit 220 from the vacuum source.

Figure 5:
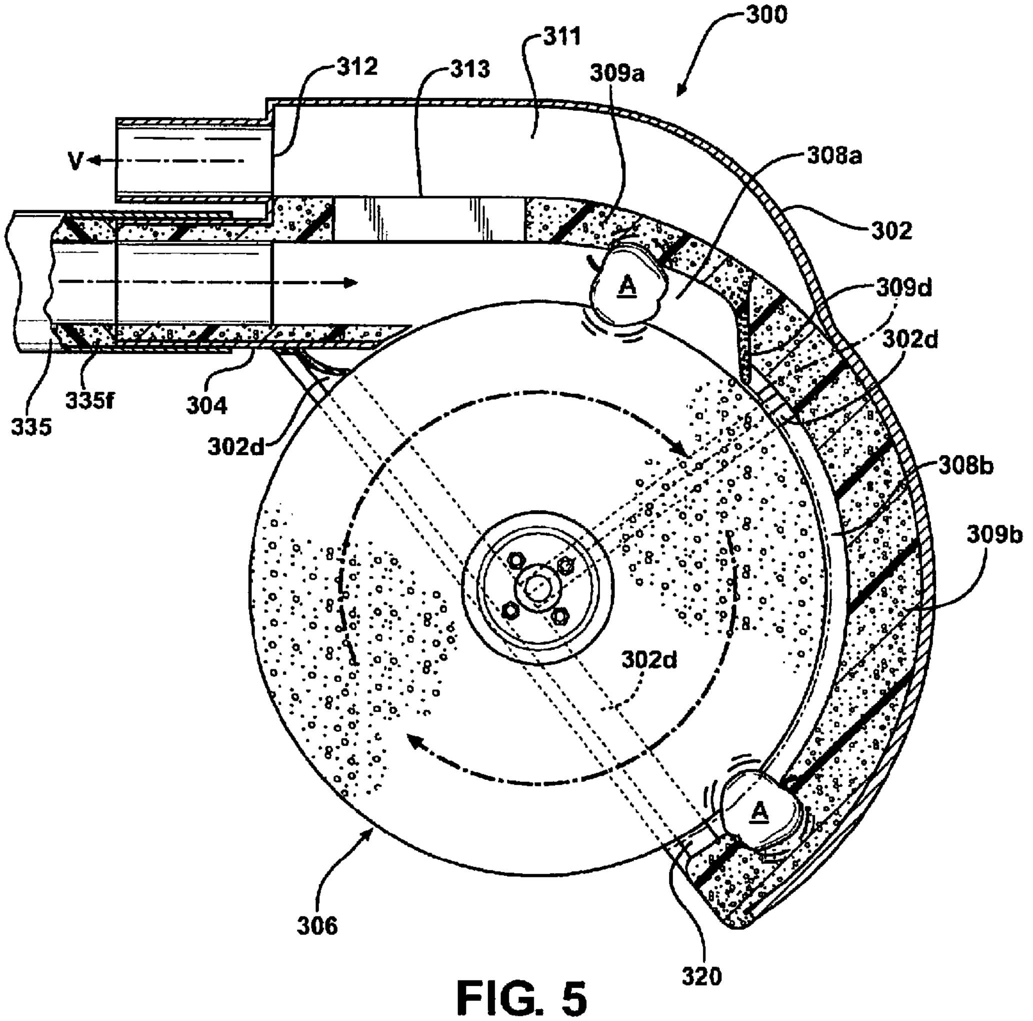
FIG. 5 is another alternate example of a fruit decelerator according to the claimed subject matter, with a decelerator body partially enclosed by a housing.

FIG. 5 illustrates a third example of decelerator at 300, with a single decelerator body in the form of a wheel 306 substantially the same as or similar to wheel 106 in FIGS. 2 and 3, but with the decelerator wheel only partially contained in a housing 302, with the decelerator wheel's moving decelerator surface 306*a* sealed from the exterior to define a sealed deceleration path 308. Fruit is delivered from tube 335 in the direction of the arrow through inlet 304, into contact with the padded surface of wheel 306 rotating clockwise at the deceleration speed, and thus into a deceleration path 308 in which the fruit has a compressive frictional fit between the wheel 306 and padding 309 on the interior of the housing. Pneumatic delivery force is generated by a vacuum source or pump V communicated to the housing 302 through an inlet 312. Inlet 312 in turn communicates with a chamber or plenum 311 in the housing above deceleration path 308 and fruit inlet 304, through one or more openings 313 formed in the padding 309 above the wheel. Opening(s) 313 are smaller than the size of the smallest expected fruit A, so that the fruit is not drawn up to vacuum inlet 312 when it enters the housing.

The compressive fit of fruit A with deceleration path 308 has enough friction that the moving wheel 306 moves incoming fruit 306 away from vacuum ports 313 located above the upstream portion 308*a* of the deceleration path 308. The vacuum or pneumatic delivery force may be maintained at the inlet 304 in different ways, and in the illustrated example is maintained with a plurality of axial drag seals 302*d* located in the housing 302 to wipingly engage the faces 306*f* of wheel 306 as the wheel rotates, and with a circumferential drag seal 309*d* separating the upstream and downstream portions 308*a* and 308*b* of the deceleration path 308. The drag seals may be flaps or drapes of closed-cell foam or rubber-like material, or a layer of closed-cell foam or other impermeable material on the surface of an open-cell foam, without limitation. Drag seal or drape 309*d* in the deceleration path 308 is biased into a wiping contact with wheel 306, for example by its molded shape or by its weight and natural drape or by a weighting material or force such as a progressively thicker layer of foam 309*b* downstream of seal 309*d* that narrows path 308 significantly over its downstream portion 308*b*, and that provides a sponge or spring force to the back of the seal to hold the seal down against the wheel except when fruit is being forced past the seal.

Deceleration path 308 may alternately be pneumatically sealed relative to exit 320 by a series of two or more seal drapes 309*d* spaced serially along path 308. Another path-sealing option is to lengthen pneumatically-sealed drape member 309*d* so that it lies substantially against the surface of wheel 306 as shown in phantom in FIG. 5, under its own weight or assisted by other weighting material or force such as foam layer 309*b* or a spring member, over a substantial or the entire length of the deceleration path 308*b*. In this latter case, multiple pieces of fruit A might be moving in spaced fashion through upstream and/or downstream portions 308*a* and 308*b* of path 308 at the same time, all the pieces of fruit moving through the path pneumatically sealed relative to one another and to the outlet 320 by the conforming fit of the lengthened drape member 309*d* around them.

Figure 6:
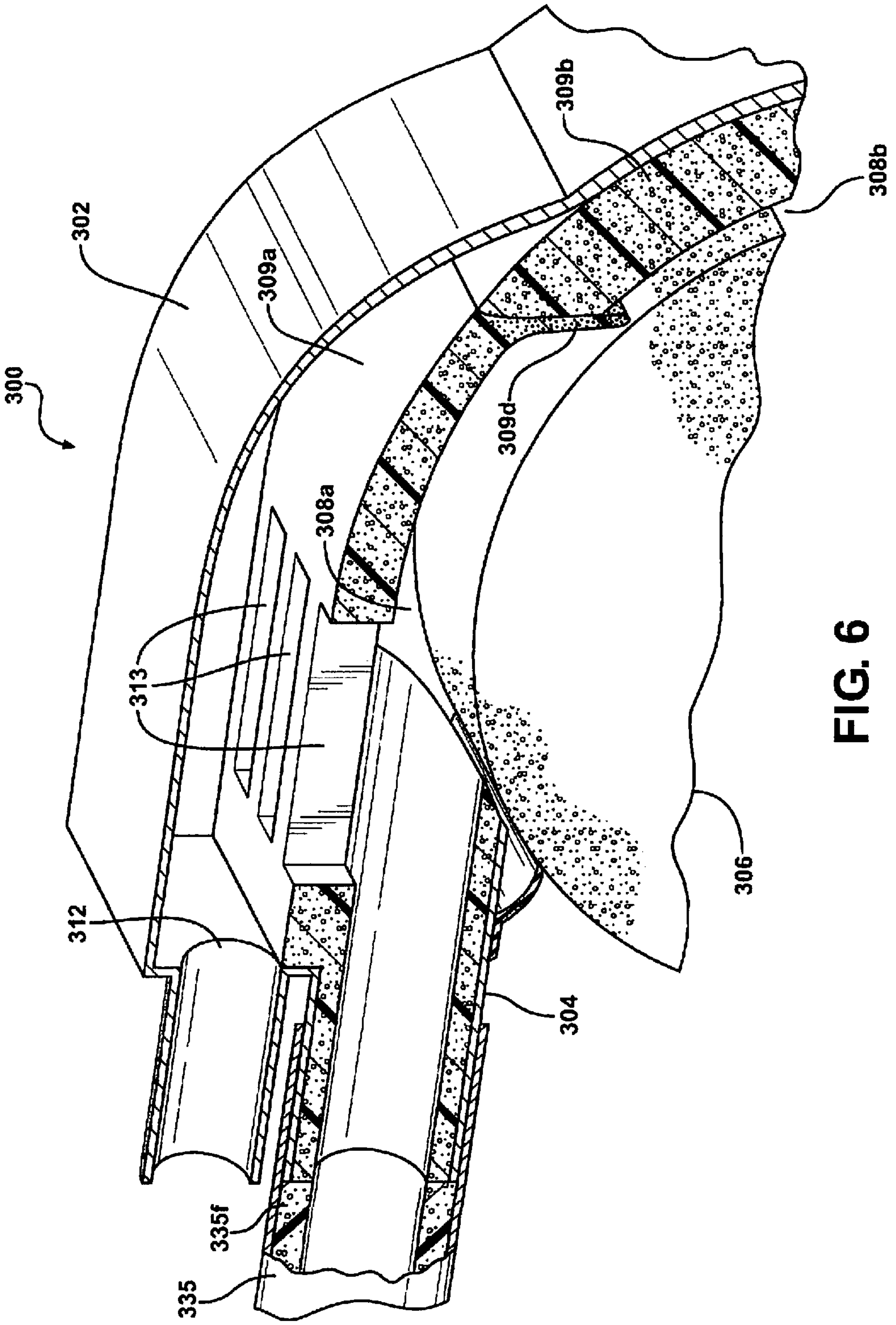
FIG. 6 is a perspective cutaway view of an upper portion of the decelerator of FIG. 5.

In the partial-housing example of FIGS. 5 and 6, fruit A exits the decelerator 300 directly at outlet 320, which coincides with the end of housing 302 and with the end of deceleration path 308. It should be understood that although the entirety of path 308 is referred to as the deceleration path, actual deceleration of fruit A to the speed of the decelerator 306 may occur over an upstream portion of the path, for example in region 308*a*, while the remainder of the path such as 308*b* primarily provides a seal to help maintain the pneumatic delivery force of the delivery tube.

Figure 7:
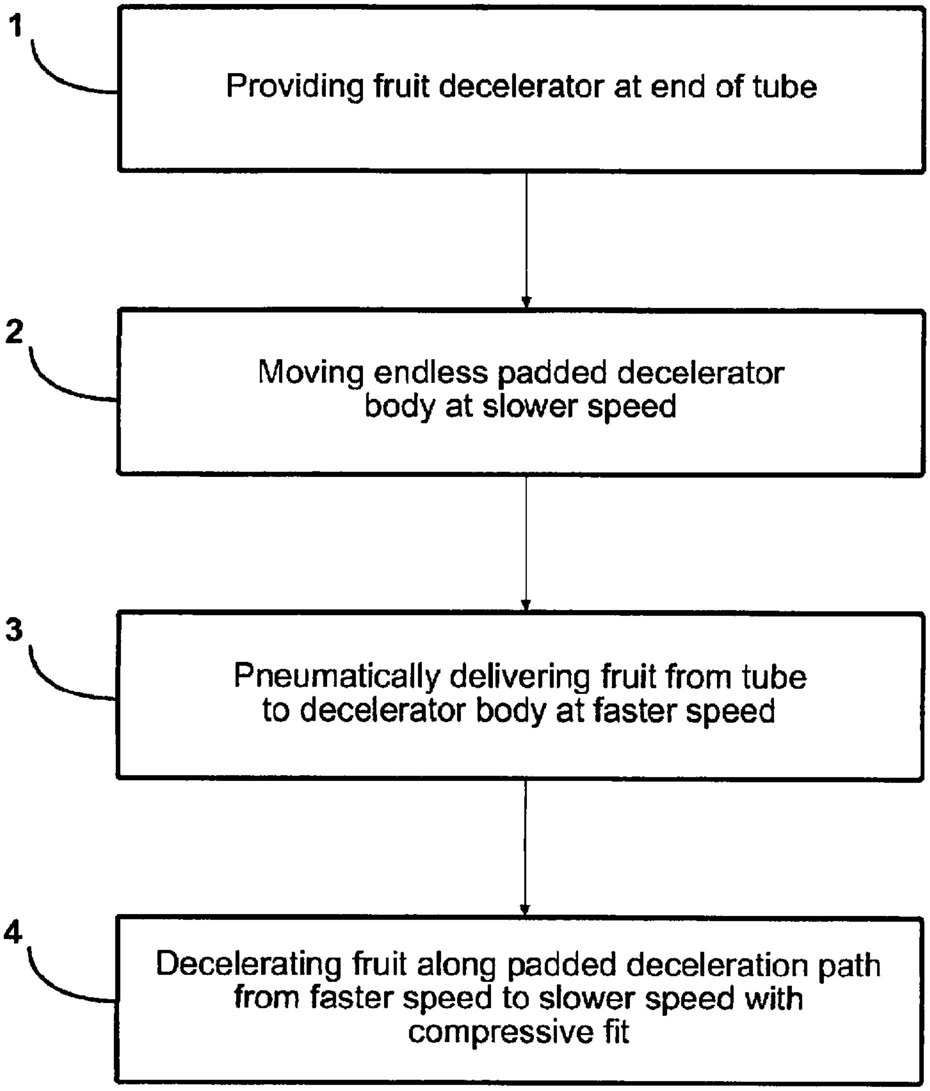
FIG. 7 is a schematic flowchart of a method according to the claimed subject matter.
Figure 8:
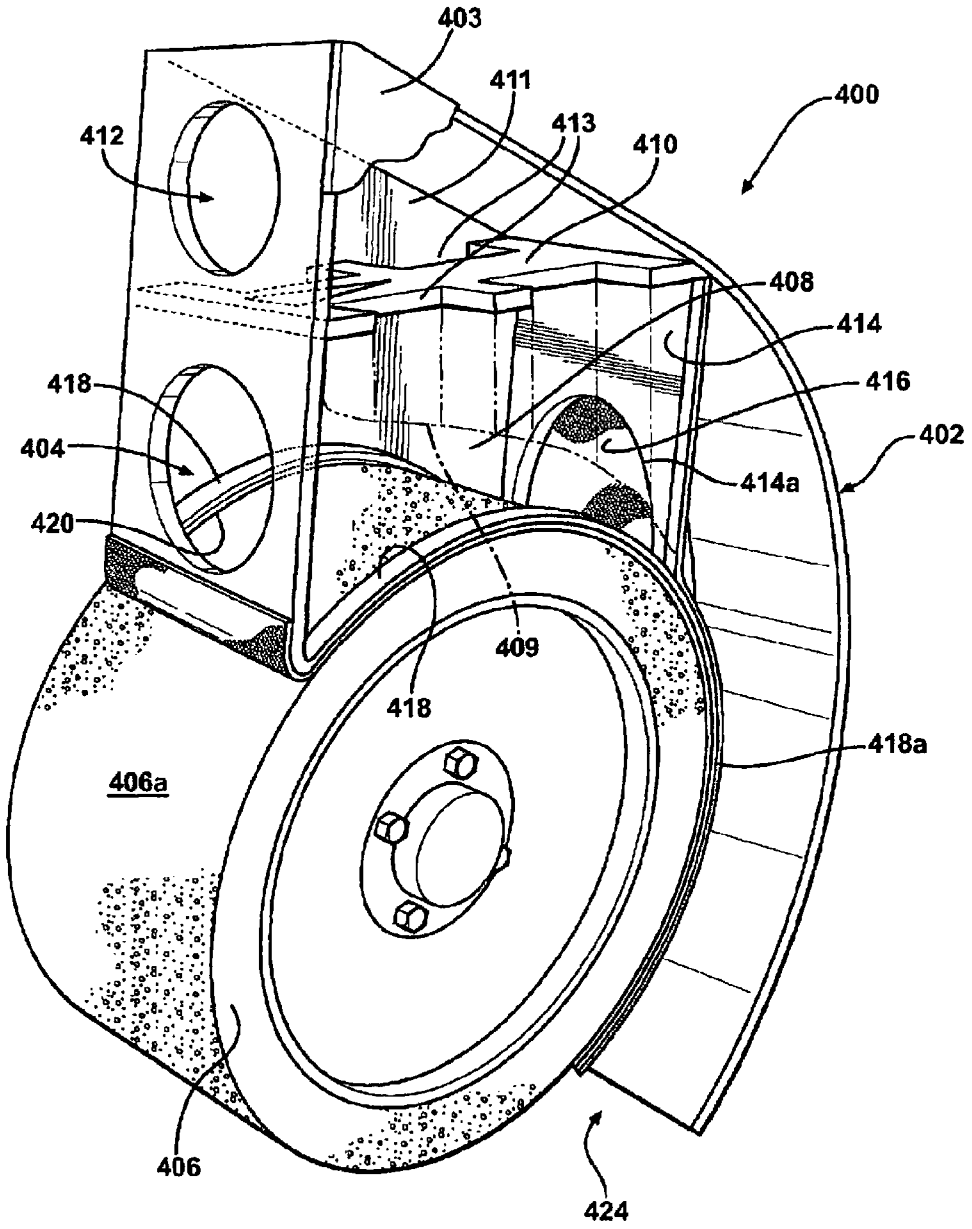
FIG. 8 is a perspective view of another alternate example of a fruit decelerator according to the claimed subject matter, with a decelerator body having only its endless moving surface in the housing, and a sidewall of the housing partially cutaway to show the interior.

FIG. 7 schematically represents, in flowchart form, a method for decelerating fruit received from a pneumatic delivery tube as described and/or readily understood from the foregoing examples of FIGS. 1 through 6. In step 1, a decelerator is provided at or connected to an end of a pneumatic fruit delivery tube. In step 2 an endless padded decelerator body is moved in the decelerator at a slower speed than the speed at which the fruit is expected to be delivered. At step 3 the fruit is pneumatically delivered from the tube to the decelerator body at the faster speed. At step 4 the fruit is decelerated by the moving body from the faster speed to at least the slower speed along a path with a compressive fit.

FIGS. 8 through 12 illustrate another alternate form of decelerator according to the claimed subject matter, in which only the moving surface of the decelerator body is in communication with the interior of the housing. Decelerator 400 has a housing 402 similar to that in FIGS. 5 and 6, with a fruit delivery inlet 404 for connection to a pneumatic delivery tube 435, and a vacuum inlet 412. The lower surface of housing 402 includes a frame 418 defining an opening 420 sized and shaped to admit a portion of the face 406*a* of decelerator wheel 406 into communication with the interior of the housing, in sufficiently sealing fashion to help maintain the pneumatic fruit delivery force. Because wheel 406 is moving, its fit with opening 420 may be a wiping frictional fit with the face and/or side surfaces of the wheel.

Fruit is delivered from tube 435 (shown in FIGS. 10-12) through inlet 404, into contact with the padded surface 406*a* of wheel 406 rotating clockwise at the deceleration speed, and thus into a deceleration path 408 in which the fruit has a compressive frictional fit between the wheel 406 and complementary padding 409 on the interior of the housing. Pneumatic delivery force is generated by a vacuum source or pump V communicated to the housing 402 through inlet 412. Inlet 412 in turn communicates with a chamber or plenum 411 in the housing above deceleration path 408 and fruit inlet 404, through one or more openings 413 formed in the padding 409 (and in an optional reinforcing divider wall 410) above the wheel 406. Opening(s) 413 are smaller than the size of the smallest expected fruit A, so that the fruit is not drawn up to vacuum inlet 412 when it enters the housing.

Figure 9:
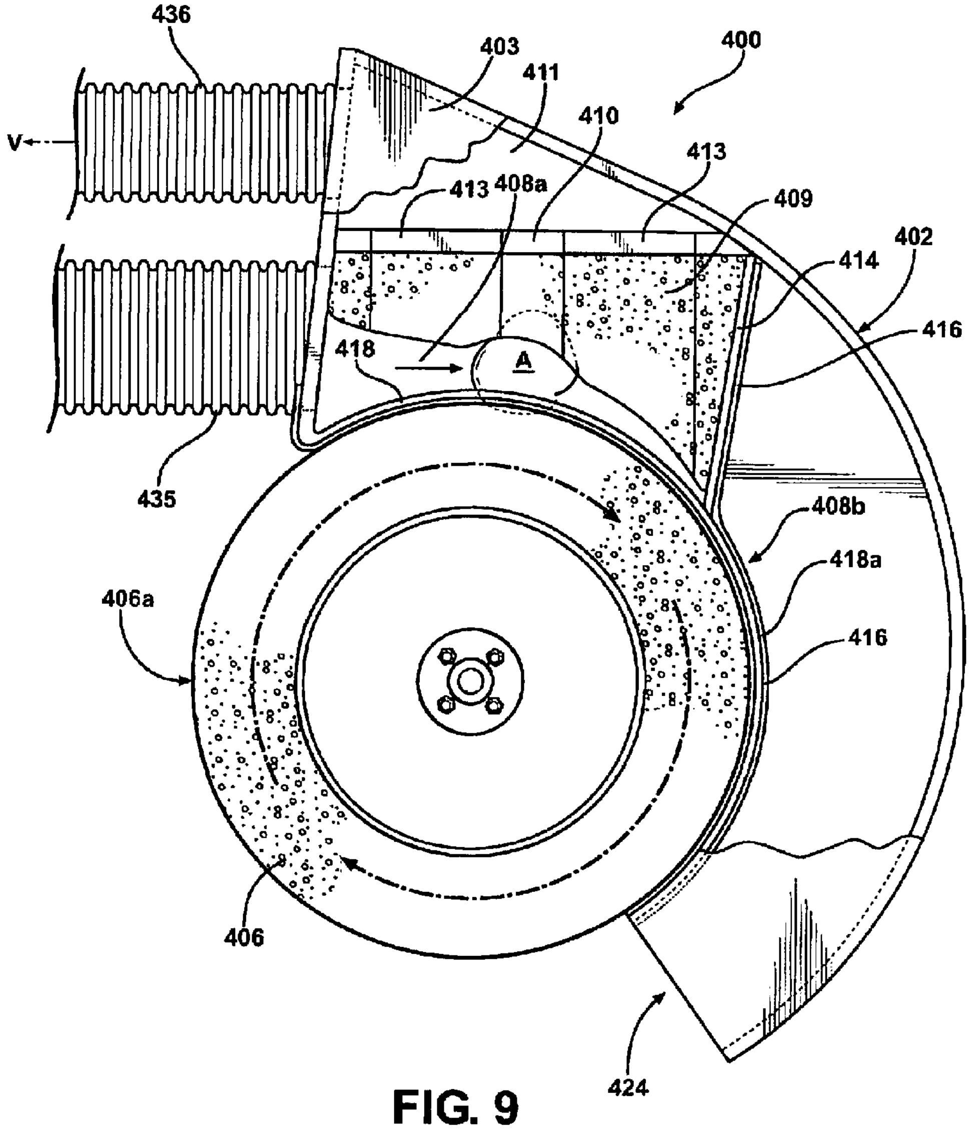
FIG. 9 is a side elevation view of the fruit decelerator of FIG. 8, showing a piece of fruit entering the fruit deceleration path.

Referring to FIG. 9, as fruit A enters the initial or primary portion 408*a* of deceleration path 408, decelerator 400 functions to decelerate the fruit with a compressive fit in the same manner as in previously described examples in FIGS. 1-6.

Figure 10:
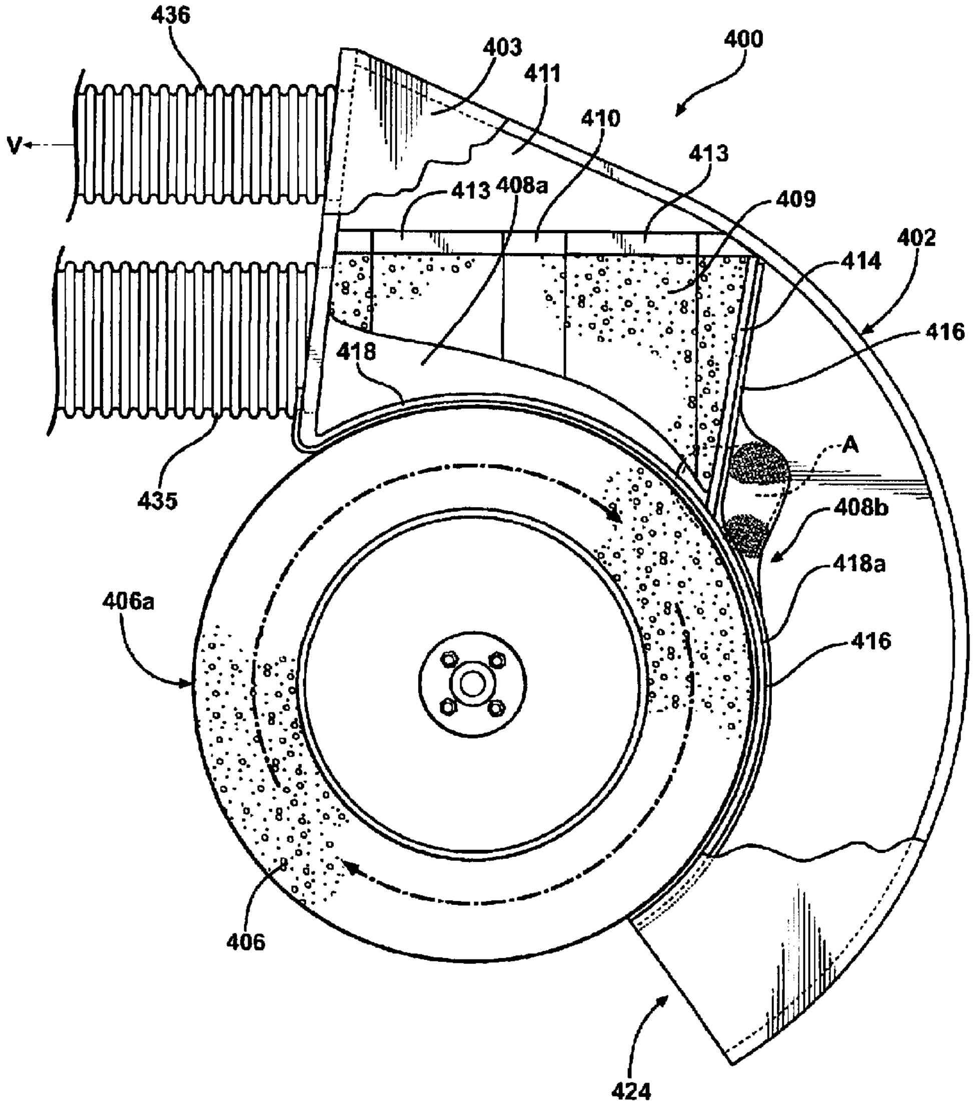
FIG. 10 is similar to FIG. 9, showing the fruit leaving a first portion of the deceleration path and engaging a second device for sealing the deceleration path relative to an exit.
Figure 11:
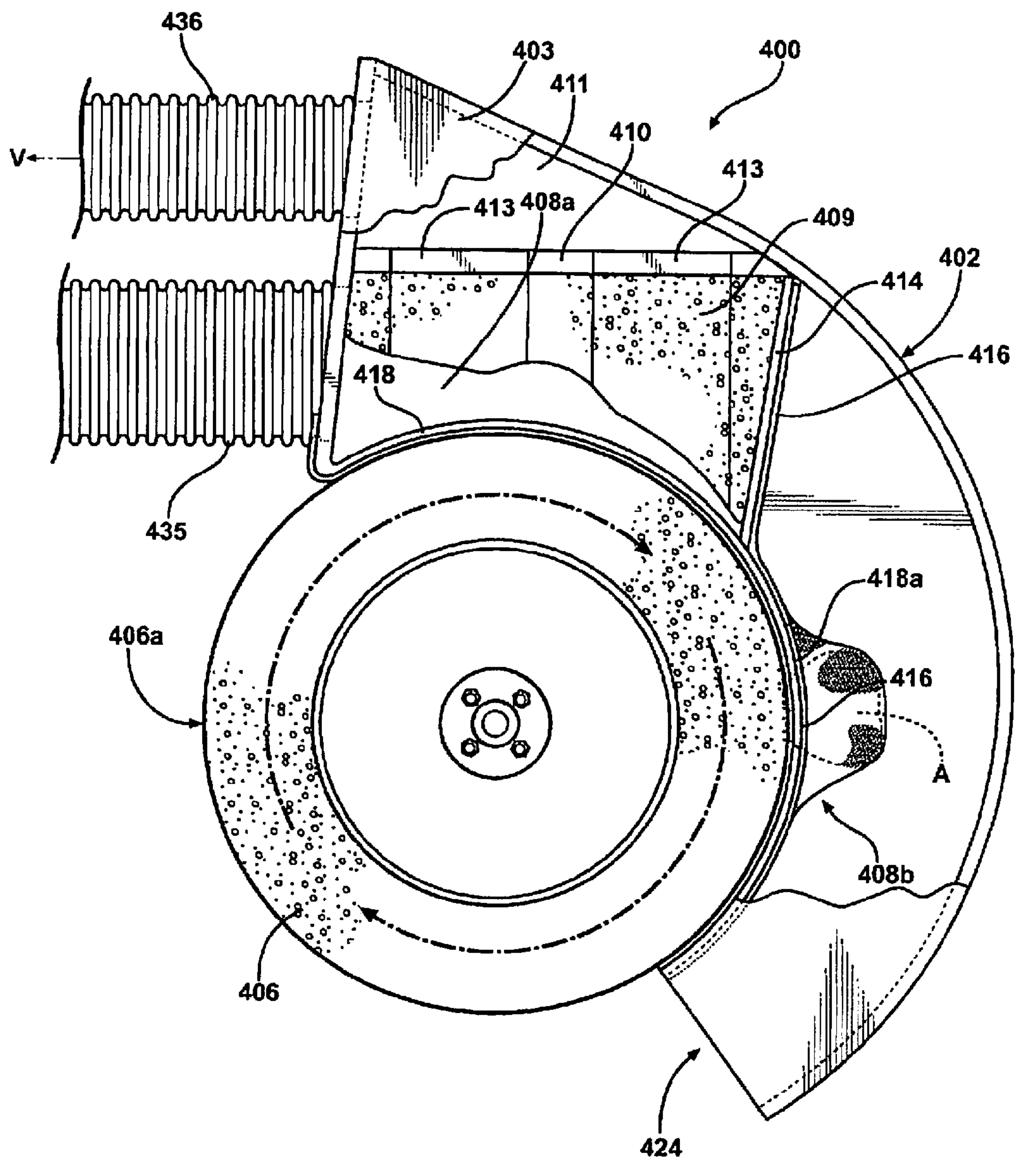
FIG. 11 is similar to FIG. 10, showing the fruit fully engaged by the second device in the second part of the deceleration path.
Figure 12:
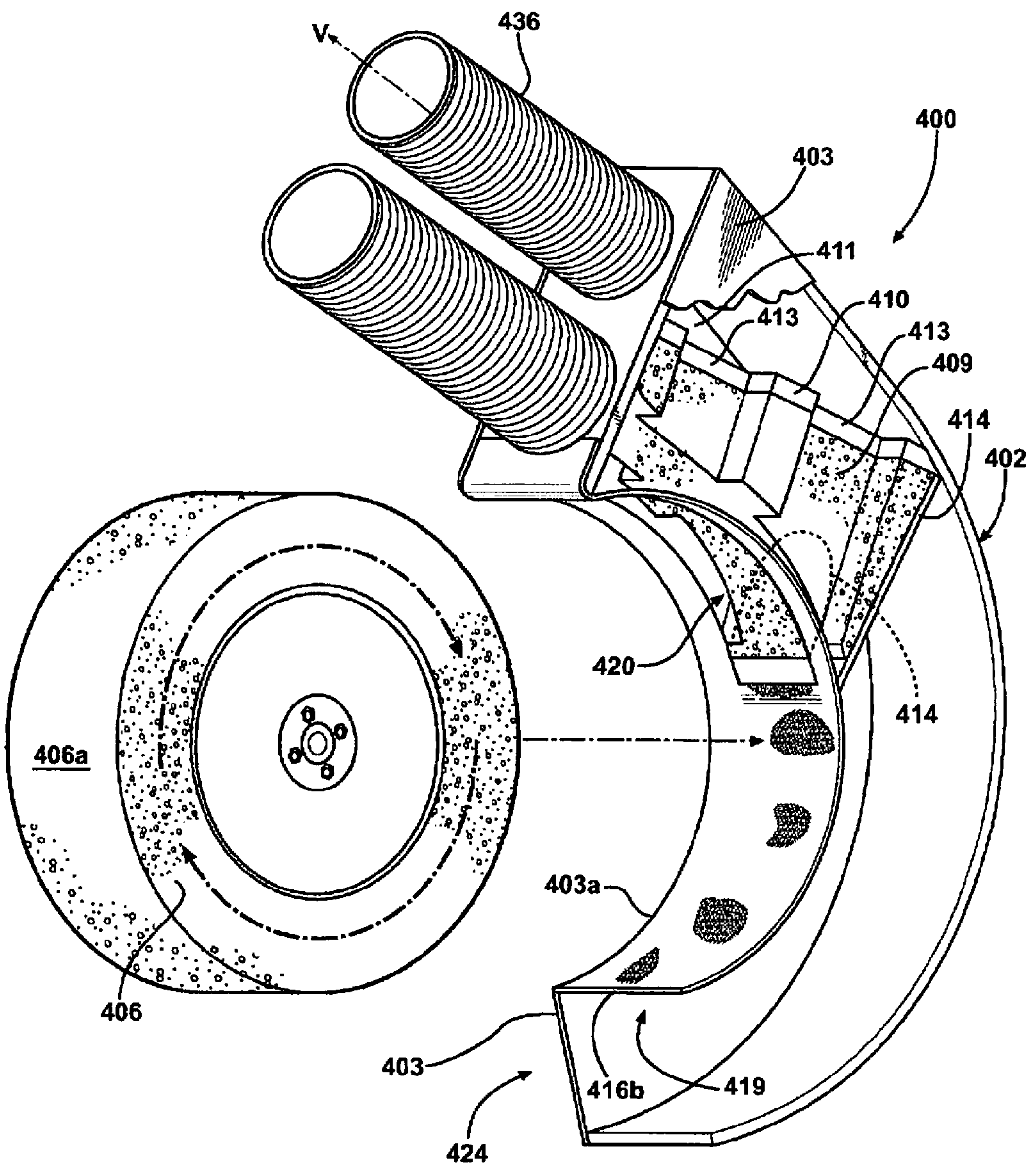
FIG. 12 is an exploded perspective view of the housing and decelerator body of FIGS. 8 through 11, with a sidewall of the housing.
Figure 12A:
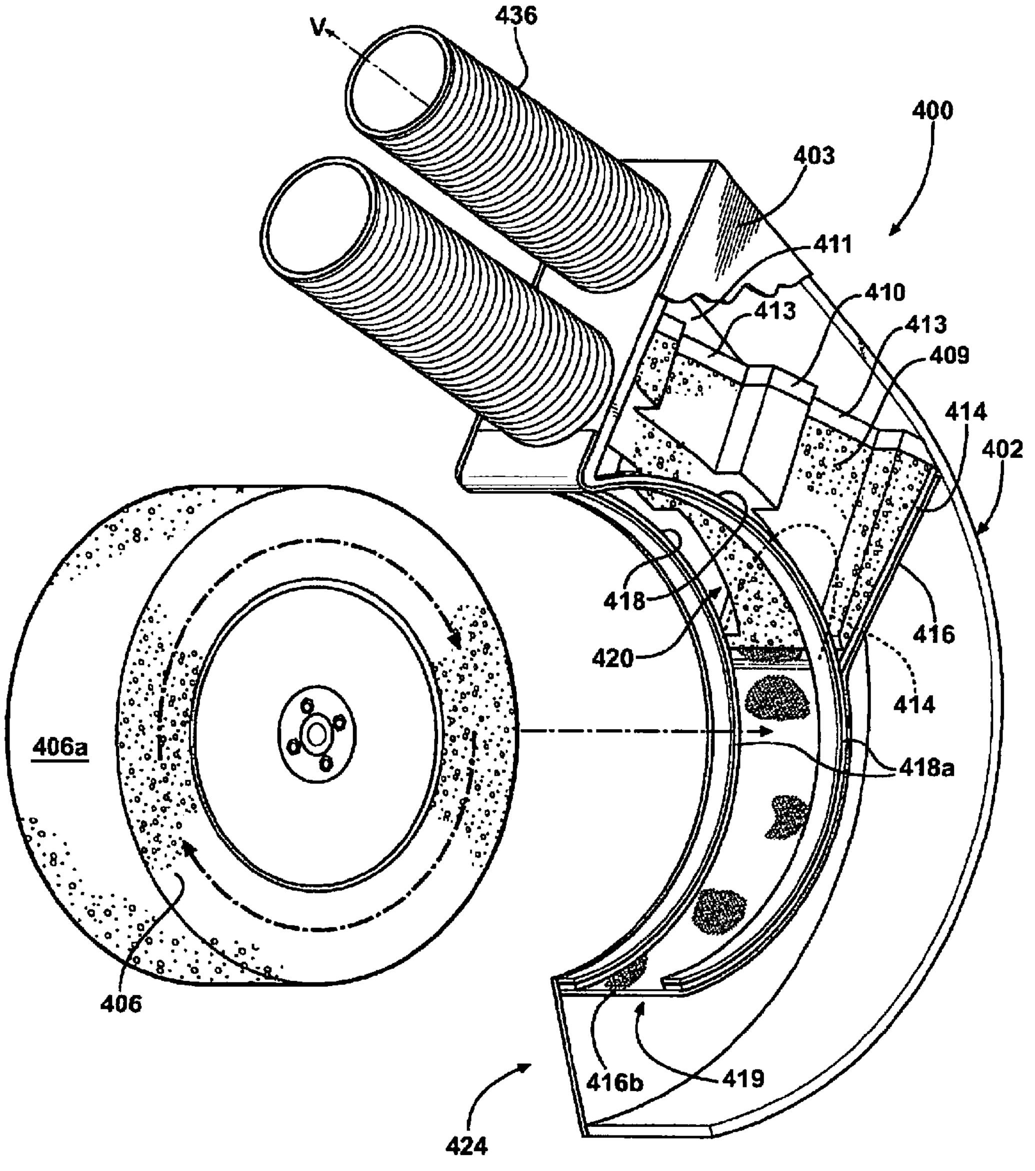
FIG. 12A is similar to FIG. 12, but shows a housing with a modified lower edge for supporting a seal member.

Referring to FIGS. 10 through 12, a sealing drape 416 of material that conforms itself to and around fruit A is used in the second part 408*b* of the decelerator path 408 to either further decelerate fruit A, if needed, and to maintain a sufficient seal around the fruit as it proceeds through and exits the decelerator to help maintain the pneumatic delivery force that delivers the fruit into the housing from tube 435. Drape 416 is secured around its edges to inside walls of the housing 402, or to an optional vertical interior partition 414 as illustrated. Partition 414 has an opening 414*a* in alignment with the fruit deceleration path 408*a* to permit fruit A to pass through into portion 408*b* after coming into contact with, and deformingly passing underneath, a central unsecured portion of drape 416 that overlies the opening and is in alignment with the deceleration path. Drape 416 extends down to the face 406*a* of wheel 406, and as illustrated preferably continues along a circumferential portion of wheel 406 coextensive with portion 408*b* of the deceleration path, its edges held against the sides or preferably against the face of the wheel by securing the drape's edges to the lower edges 403*a* of the housing sidewalls 403, for example with adhesive or mechanical fasteners. In the alternate embodiment of FIG. 12A, the lower edges 418, 418*a* of the housing sidewalls are extended in width or are provided with flanges that curve around the face or sides of the wheel in contact with the wheel or closely adjacent thereto to provide a mounting surface for the edges of drape 416 and further to protect the edges of the drape from wear due to friction with the decelerator wheel. The housing sidewall lower edges 403 (or flange-like extensions or shelves 418*a*) terminate without any rigid cross-member or cross-connection to define an opening 419 in the end of the deceleration path near the housing exit. The downstream end 416*b* of drape 416 is unsecured at opening 419, permitting fruit A to exit the end of the drape. Opening 419 may help define the exit 424 from housing 402, where the fruit A is delivered at its decelerated state to a storage or further processing location.

Figure 13:
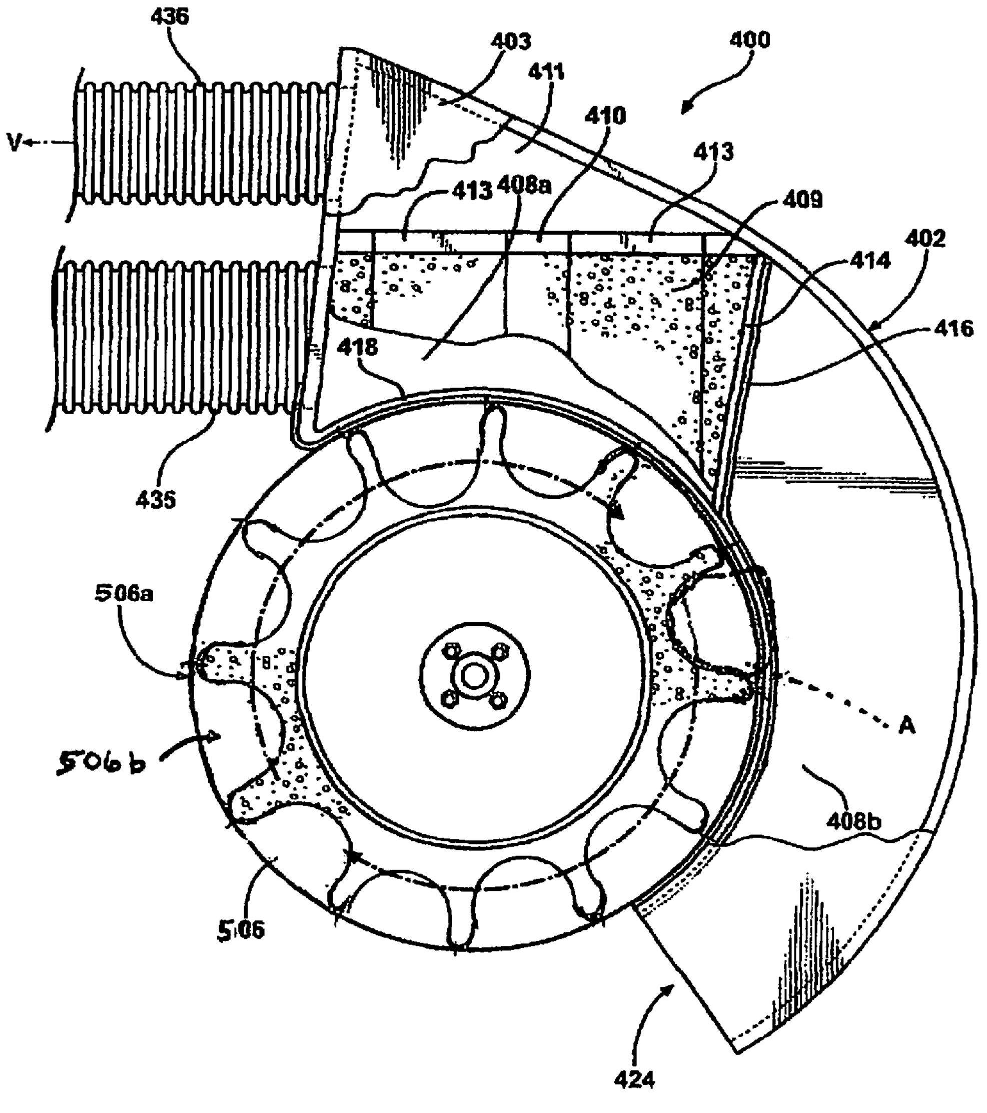
FIG. 13 is a side elevation view of a fruit decelerator wheel body formed with a plurality of cavities and showing a piece of fruit received within one of the cavities.

In the further embodiment of FIG. 13, fruit is delivered from tube 435 through inlet 404, into contact with the padded surface 506*a* of wheel 506 rotating clockwise at the deceleration speed, and thus into a deceleration path 408 in which the fruit has a compressive frictional fit between the wheel 506 and complementary padding 409 on the interior of the housing. In contrast to the embodiment of FIGS. 10-12, the fruit is separated from surrounding fruit on the wheel 506 by the inclusion of cavities 506*b* on the padded surface 506*a* of wheel 506. This separation precludes bruising or other damage to the fruit due to fruit-to-fruit contact. The cavities 506*b* are further coordinated with the expected size of the fruit being collected. The cavities 506*b* will be sized to minimize the backward rotation and migration of the fruit relative to the surface 506*a* of the wheel 506. Without the cavities, it is observed that the fruit will counter-rotate relative to the wheel 406 of FIGS. 10-12, and travel backwards along the surface 406*a* of the wheel 406, resulting in the effective travel rate of the fruit around the wheel 406 being greatly reduced. With respect to the wheel 506, the fruit engages the wheel 506 and the padding 409 of the housing, compressing the padded surface 506*a*. As with the wheel 406, the fruit will tend to counter-rotate. With the provision of cavities 506*b*, the backward progression is limited as the individual fruit engages a cavity 506*b*. The fruit will generally remain in a compressive fit between the padding 409 of the housing and the padded surface 506*a* of the wheel 506, but undersized fruit might fall into the cavity 506*b* and out of contact with the padding 409. Thus, the provision of the cavities 506*b* prevents the fruit from continuously migrating or rolling back along the surface 506*a* of the wheel 506, even in the presence of nominal counter-rotation. Eliminating this backward travel thus increases throughput of the decelerator.

Figure 14:
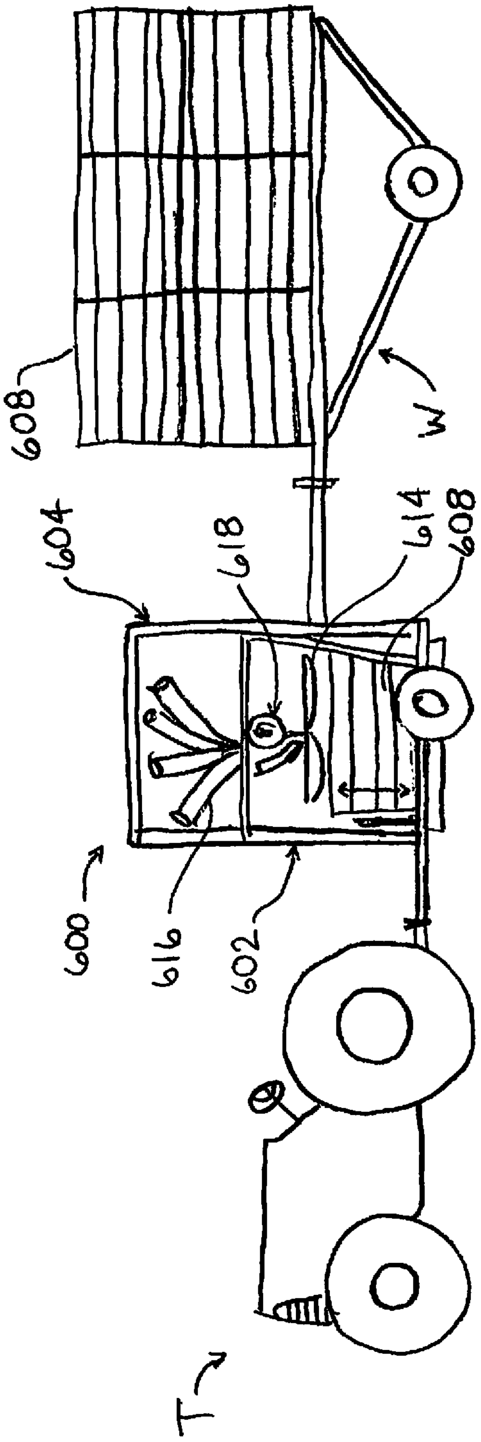
FIG. 14 is a side view of a tractor-towed carriage housing a passive-feed decelerator and filler assembly with a trailing wagon of empty fruit bins.
Figure 16:
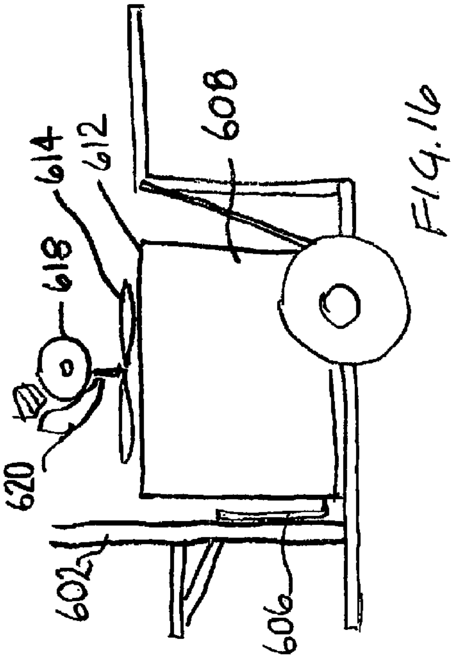
FIG. 16 is a partial side view of the carriage of FIG. 14.
Figure 15:
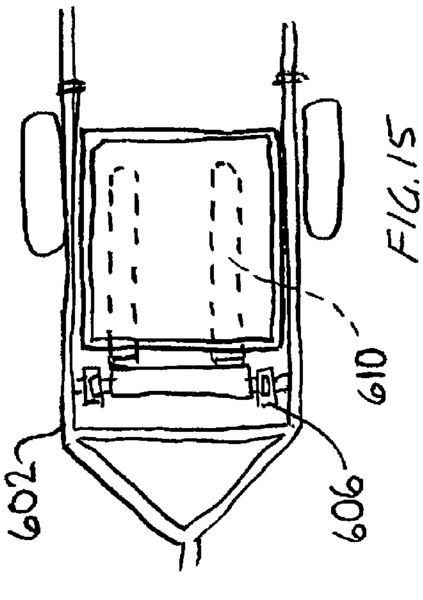
FIG. 15 is a partial top view of the carriage of FIG. 14.
Figure 17:
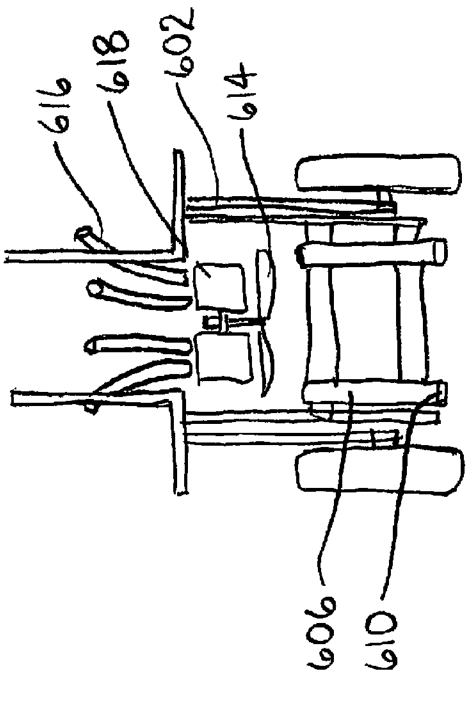
FIG. 17 is a rear view of the carriage of FIG. 14.
Figure 19:
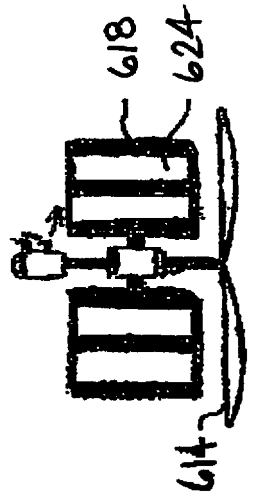
FIG. 19 is a front view of the passive-feed decelerator and filler assembly of FIG. 14.
Figure 18:
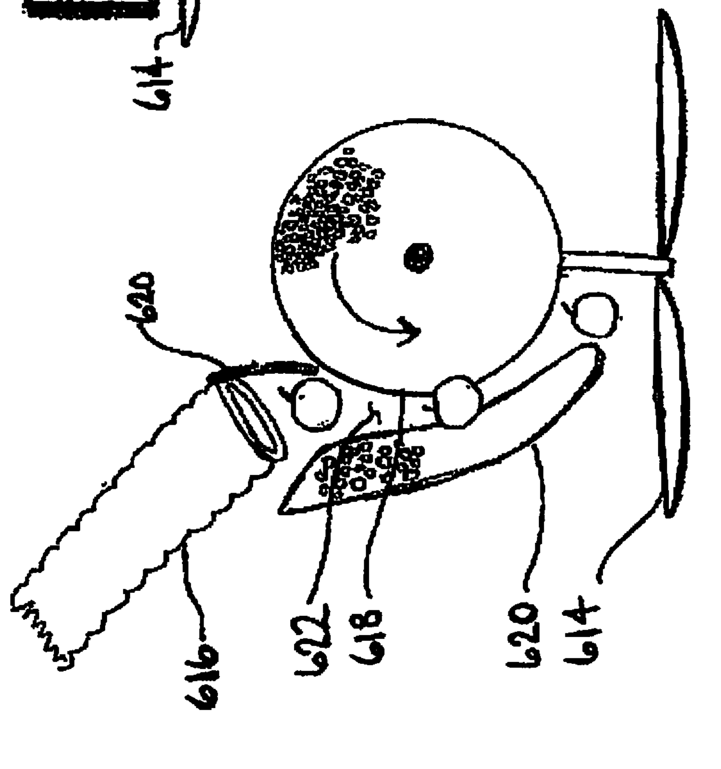
FIG. 18 is a side view of the passive-feed decelerator and filler assembly of FIG. 14.

In a further embodiment shown in FIGS. 14-20, a passive feed decelerator and filler 600 is provided. In FIG. 14, the decelerator and filler 600 is shown in a towed configuration, with a carriage 602 being towed by a tractor T, and trailing a wagon W carrying fruit bins 604. The decelerator and filler 600 is fixedly mounted within the tubular framework 604 of the carriage 602 relative to a given datum H. Beneath the decelerator and filler 600, a fork lift mechanism 606 is mounted to the carriage 602 for vertical movement of a fruit bin 608 carried within the carriage 602. The fruit bin 608 is supported within the carriage by the forks 610 of the fork lift mechanism 606. The lower portion of the carriage 602 is open to the rear to allow movement of the fruit bin 608 into and out of the carriage 602.

In operation, with a fruit bin 608 in place within the carriage 602, the fork lift mechanism 606 initially raises the fruit bin 608 to its highest position, generally with the upper extent 612 of the fruit bin 608 at the datum H. As the fruit bin 608 is raised to its uppermost position, the decelerator and filler 600 enters the fruit bin 608 until the distributor (elephant ears) 614 approaches the bottom of the fruit bin 608 until the distributor 614 is proximate the bottom of the fruit bin 608 when the fruit bin 608 is at its highest position.

As the decelerator and filler 600 operates, fruit F is fed through one or a plurality of feed tubes or channels 616 to the decelerator body 618. As the fruit exits the tube or channel 616, a padded deflector flap 620 (FIG. 18) guides the fruit into the deceleration path 622. The decelerator body 618 slows the progress of the fruit and encourages fruit singularity by means of the multiplicity of cavities or indentations in the surface of the decelerator body (ref. FIG. 13). The fruit passes through by the decelerator body 618 onto the distributor 614 which distributes the fruit over the exposed surface of the bottom of the fruit bin 608. The decelerator body 618 can take the form of multiple padded wheels (FIG. 19) with multiple channels 624 for receiving fruit from a plurality of the tubes 616.

As the fruit bin 608 begins to fill with fruit, the fork lift mechanism 606 lowers the fruit bin 608. The pace of lowering is regulated to minimize the distance that fruit will fall as it is passes by the distributor 614. This pace of lowering can be controlled by a controller (not shown) receiving height signals, such as from an optical sensor or electric eye 626 (FIG. 20).

Figure 20:
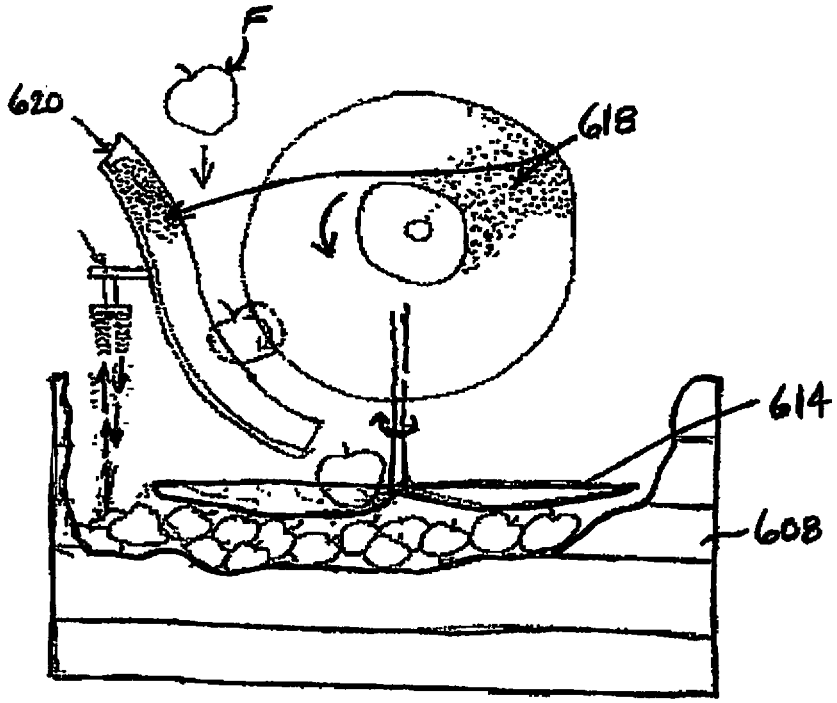
FIG. 20 is a side view of a framework for the fruit decelerator wheel body of FIG. 13.

FIG. 20 illustrates a decelerator and distributor utilizing an optical sensor or electric eye 626 that provides feedback to a controller (not shown) to regulate the relative elevation of the fruit bin 608 and the decelerator and filler 600, so that fruit passing through the decelerator is deposited safely in the bin 608 by the distributor 614 with minimal vertical drop.

Figure 21:
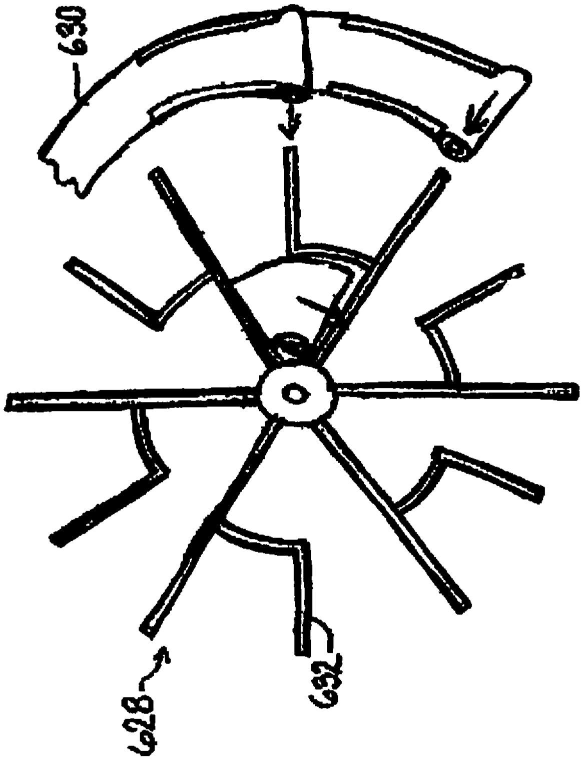
FIG. 21 is a side view showing a framework for mounting sleeves of cushion material.

FIG. 21 illustrates a framework or lattice 628 for mounting sleeves of cushion material 630. The rigid spindles 632 of the lattice 628 provide for dividing the surface of the resulting decelerator body into identifiable cavities (506*a* of FIG. 13) with reduced rigidity that will receive fruit while the stiffer spindles 632 of the lattice 628 separate consecutively received fruit into adjacent cavities, creating fruit singularity with the decelerator.

It will finally be understood that the disclosed embodiments are representative of presently preferred examples of how to make and use the claimed invention as defined by the claimed subject matter, but are intended to be explanatory rather than limiting of the scope of the invention as defined by the claims. Reasonable variations and modifications of the illustrated examples in the foregoing written specification and drawings are possible without departing from the scope of the invention as defined by the claimed subject matter. It should further be understood that to the extent the term "invention" is used in the written specification, it is not to be construed as a limiting term as to number of claimed or disclosed inventions or the scope of any such invention, but as a term which has long been conveniently and widely used to describe new and useful improvements in technology. The scope of the invention is accordingly defined by the following claims.

What is claimed is:

1. A padded decelerator wheel for a fruit-collecting and container-filling apparatus, the decelerator wheel comprising a rotatably-driven decelerator body associated with a housing of the apparatus and comprising a padded surface at least a portion of which is in communication with an interior of the housing, the padded surface having a series of depressions for receiving the fruit and separating adjacent fruit in the deceleration path to prevent fruit to fruit contact and to encourage forward progress of the fruit congruent to the padded surface and prevent counter-rotation of the fruit that reduces forward progress of the fruit relative to the decelerator body.

2. A fruit decelerator apparatus for use with a pneumatic fruit-delivery tube, comprising:

a housing comprising a padded fruit deceleration path, a pneumatic delivery tube inlet adapted to be connected to and receive fruit from an end of a pneumatic fruit-delivery tube, and a fruit exit, the inlet defining a direction of fruit delivery into the housing;

a rotatably-driven decelerator body associated with the housing and comprising a padded surface at least a portion of which is in communication with an interior of the housing, the padded surface having a series of depressions for receiving the fruit and separating adjacent fruit in the deceleration path to prevent fruit to fruit contact and to encourage forward progress of the fruit congruent to the padded surface and prevent counter-rotation of the fruit that reduces forward progress of the fruit relative to the decelerator body, the padded surface comprising at least a portion of the deceleration path, at least an initial contact portion of the padded surface positioned in substantially tangential alignment with the fruit delivery tube inlet at an initial fruit contact portion of the deceleration path adjacent the inlet to receive fruit entering the deceleration path from the pneumatic delivery tube inlet, the padded endless surface movable relative to the housing in endless rotating fashion in the direction of fruit delivery, the decelerator body having a rotational fruit-decelerating speed when rotatably driven relative to the housing comprising a speed slower than an expected pneumatically-delivered speed of fruit entering the deceleration path from the delivery tube inlet, at least a portion of the deceleration path comprising a compressive path defined between the housing and the padded endless surface of the decelerator body in the housing, the compressive path sized to receive fruit of an expected smallest size from the pneumatic delivery tube inlet and to carry such received fruit in a compressive moving fit, the compressive path extending through at least a portion of the housing between the inlet and the exit; and a pneumatic fruit-conveying seal located in the housing between the fruit inlet and the fruit exit.

3. The decelerator apparatus of claim 2, further comprising a pneumatic vacuum source associated with the housing and capable of communicating a vacuum pressure to the delivery tube inlet through the housing.

4. The decelerator apparatus of claim 2, wherein the pneumatic fruit-conveying seal comprises a drape of material associated with the padded surface of the decelerator body.

5. The decelerator apparatus of claim 2, further comprising a rotatably-driven secondary device in the housing between the deceleration path and the exit to receive the fruit from the deceleration path and to deliver the decelerated fruit to the exit.

6. The decelerator apparatus of claim 5, wherein the secondary device includes a pneumatic seal between the exit and the deceleration path to maintain pneumatic delivery force in the deceleration path and/or in the delivery tube.

* * * * *